CLIPPING SYSTEM

Filed March 6, 1963

John T. Heizer,
INVENTOR.
BY Edward J. Kelly
Herbert Berl
Jack W. Voigt

United States Patent Office 3,196,289
Patented July 20, 1965

3,196,289

CLIPPING SYSTEM

John T. Heizer, Haddonfield, N.J., assignor, by mesne assignments, to the United States of America as represented by the Secretary of the Army Filed Mar. 6, 1963, Ser. No. 263,686
2 Claims. (Cl. 307—88.5)

This invention relates generally to a clipping circuit and more particularly to a clipping circuit which clips both high level and low level signals.

Similar circuits using conventional techniques employ at least twice as many components, two semiconductors, and suffer from storage time problems in the semiconductors, as well as being sensitive to supply voltage and component variations.

In order to overcome these problems, I have invented a circuit for limiting a signal which is accomplished with a minimum of components, including only one semiconductor, a commonly available diode. The peak-to-peak signal output is constant, and independent of supply voltage variations. This circuit operates at normal transmission line impedance levels.

In view of these facts, an object of this invention is to provide a clipping system which will clip both high level and low level signals.

Another object of this invention is to provide an inexpensive signal limiting circuit.

A further object of this invention is to provide a signal limiting circuit having a minimum of components.

A still further object of this invention is to provide a signal limiting circuit that has a constant peak-to-peak signal output.

The foregoing and other objects of this invention will be more fully apparent from the following detailed description of the invention and from the accompanying drawings, in which.

Figure 1:
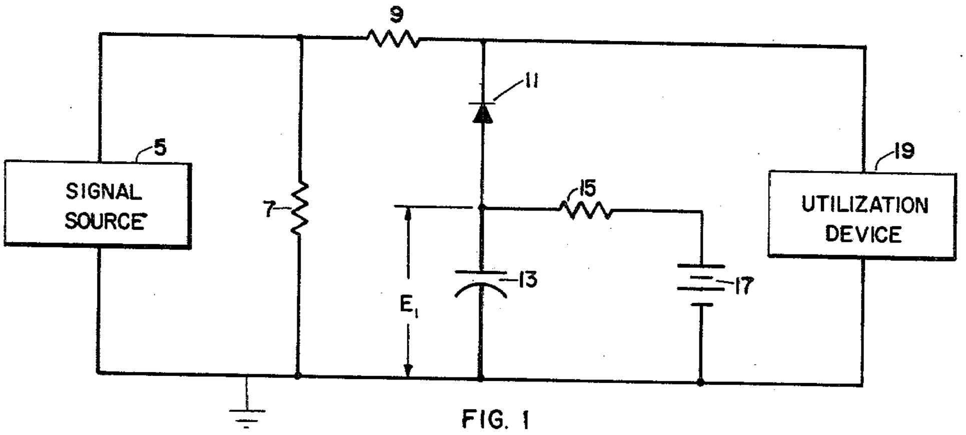
FIGURE 1 is a circuit diagram of a signal limiting circuit according to the present invention.

Referring to FIGURE 1 of the drawing, there is represented a signal limiting circuit constructed in accordance with the present invention wherein a zener P-N junction diode 11 is connected in series with capacitor 13. Capacitor 13 is charged to a value $E_1$ by means of voltage supply 17 connected across the capacitor. A resistor 15 is placed in series with the voltage supply to limit the current through the capacitor. The output of this circuit is taken as the voltage drop across diode 11 and capacitor 13. Connected between the output and input of the circuit is a resistor 9 to isolate the input from output of the circuit. A resistor 7 is connected in shunt with the input circuit as a terminating impedance for the signal applied to the circuit. Resistor 7 is connected in parallel with the circuit impedance which is very close to the value of resistor 9.

Figure 2:
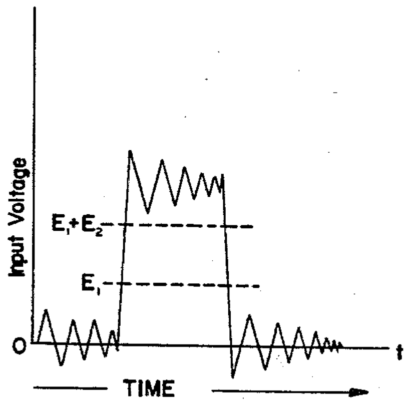
FIGURE 2 is a graph of a particular input signal showing the upper and lower clipping levels.

In operation, a signal source 5 is connected to the input of the circuit while a utilization device 19 is connected to the output of the circuit. The output of the signal source could be for example, like that shown in FIGURE 2 where the upper and lower level signal has a pronounced ripple which is undesirable and needs to be limited to the levels of $E_1$ and $E_1+E_2$ as shown.

Figure 3:
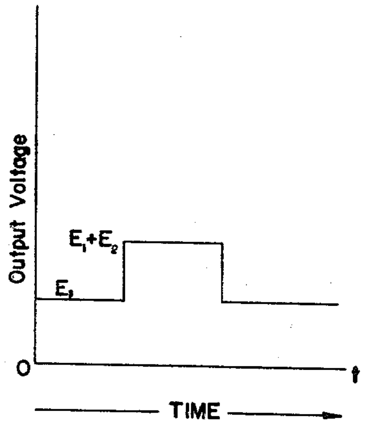
FIGURE 3 is a graph of the output signal for the particular input signal shown in FIGURE 2.

A signal entering the input is terminated by resistor 7 in parallel with the circuit impedance. During the period when the signal is less than $E_1$ diode 11 functions as a normal diode. Current flows through resistors 7, 9 and 15, and capacitor 13 assumes a voltage $E_1$ which is equal to the voltage drop across resistor 7, resistor 9, and the forward drop of diode 11. Capacitor 13 has sufficient capacitance to ensure little change in $E_1$ for the duration of the signal. A small signal, less than $E_1$ in amplitude, is conducted to ground through the diode 11 and capacitor 13, by virtue of the fact that the diode is maintained in conducting state. As the input voltage becomes more positive exceeding $E_1$, diode 11 ceases to conduct, allowing the output also to become more positive. This continues until the input exceeds $E_1+E_2$, the zener break down voltage of diode 11. This limits the maximum output voltage to a value of $E_1+E_2$. All greater signals flow to ground through diode 11 and capacitor 13. Upon removal of the signal, the output voltage returns to $E_1$ and will remain at this value until a signal greater than $E_1$ is applied to the input as shown in FIGURE 3. Thus, if sufficient input amplitude is provided, the output pulse height will be constant for wide variation in $E_1$. Similarly, wide variations in resistors 7, 9 and 15, and the voltage supply 17 can be tolerated with no effect on the output pulse height.

Note that for a steep-sided input pulse, diode 11 conducts almost continuously, allowing resistors 7 and 9 to be so chosen that they form a good termination for the signal source.

It should be further noted that all polarities may be reversed to provide clipping of negative signals.

Obviously many modifications and variations of the present invention are possible in the light of the above teaching. It is therefore to be understood that within the scope of the appended claims the invention may be practiced otherwise than as specifically described.

What is claimed is:

1. A clipping system comprising:
(a) a zener diode having a first and second terminal;
(b) said first terminal being the output of said clipping system;
(c) a capacitor connected between the second terminal of said diode and ground potential;
(d) a first resistor having one end connected to the second terminal of said diode;
(e) a voltage supply, poled in the forward direction of said diode, connected between the other end of said first resistor and ground potential;
(f) a second resistor having one end connected to the first terminal of said diode and the second end thereof being the input terminal;
(g) a third resistor connected between said input of said system and ground;
(h) a signal source connected to the input of said system; and
(i) a utilization circuit connected to said output of said system.

2. A signal confining circuit comprising:
(a) a signal source having a unidirectional signal which is to be confined;
(b) a first impedance connected between said signal source and ground potential;
(c) a second impedance having one end connected to said signal source;
(d) a zener diode having a reverse breakdown voltage which is less than the peak amplitude of the applied signal;

(e) a capacitor connected in series with said diode;

(f) said series connection of said diode and said capacitor being connected between the other end of said second impedance and ground potential;

(g) a voltage supply connected in shunt with said capacitor for charging said capacitor with a voltage poled in the forward direction of said diode and to a predetermined value; and (h) a utilization device connected in shunt with said series connected diode and capacitor.

References Cited by the Examiner

UNITED STATES PATENTS

| | | | |
|---|---|---|---|
| 2,992,399 | 7/61 | Van Tassel et al. ------ | 307—88.5 |
| 3,023,355 | 2/62 | Thorsen -------------- | 307—88.5 |
| 3,060,326 | 10/62 | Watson --------------- | 307—88.5 |
| 3,064,140 | 11/62 | Reach et al. ---------- | 307—88.5 |
| 3,132,259 | 5/64 | Magleby -------------- | 307—88.5 |

JOHN W. HUCKERT, *Primary Examiner.*

ARTHUR GAUSS, *Examiner.*